(12) United States Patent
Cougar

(10) Patent No.: US 11,068,838 B1
(45) Date of Patent: Jul. 20, 2021

(54) SYSTEM AND METHOD FOR DELIVERING TO A PACKAGE RECEPTACLE USING A DRONE

(71) Applicant: Alex Cougar, Grosse Pointe, MI (US)

(72) Inventor: Alex Cougar, Grosse Pointe, MI (US)

(*) Notice: Subject to any disclaimer, the term of this patent is extended or adjusted under 35 U.S.C. 154(b) by 0 days.

(21) Appl. No.: 16/888,267

(22) Filed: May 29, 2020

(51) Int. Cl.
| | |
|---|---|
| *B64C 39/02* | (2006.01) |
| *B64D 1/00* | (2006.01) |
| *B64D 1/02* | (2006.01) |
| *B64D 1/08* | (2006.01) |
| *G05D 1/00* | (2006.01) |
| *G06Q 30/00* | (2012.01) |
| *G06Q 10/08* | (2012.01) |
| *H04W 4/40* | (2018.01) |

(52) U.S. Cl.
CPC ..... *G06Q 10/08355* (2013.01); *B64C 39/024* (2013.01); *G06Q 10/0832* (2013.01); *G06Q 10/0833* (2013.01); *H04W 4/40* (2018.02); *B64C 2201/127* (2013.01); *B64C 2201/128* (2013.01)

(58) Field of Classification Search
CPC ......... G06Q 10/08355; G06Q 10/0833; G06Q 10/0832; G06Q 10/06; G06Q 10/08; B64C 39/024; B64C 2201/127; B64C 2201/128; H04W 4/40; G08G 1/16; G05D 1/00; B64D 1/00; B64D 1/02; B64D 2201/128; B64D 2201/146; B64D 2201/20; B64D 2201/201
See application file for complete search history.

(56) References Cited

U.S. PATENT DOCUMENTS

| | | | |
|---|---|---|---|
| 9,494,937 B2 * | 11/2016 | Siegel | G05D 1/104 |
| 10,349,770 B1 | 7/2019 | Cougar | |
| 10,489,739 B2 * | 11/2019 | Streebin | G06Q 10/08345 |
| 2016/0246304 A1 * | 8/2016 | Canoy | G05D 1/0011 |
| 2017/0090484 A1 * | 3/2017 | Obaidi | B64D 47/08 |
| 2017/0255896 A1 * | 9/2017 | Van Dyke | A47G 29/141 |
| 2018/0155011 A1 * | 6/2018 | Greiner | B64D 1/22 |
| 2019/0062055 A1 * | 2/2019 | Hance | G06Q 10/083 |
| 2019/0130349 A1 * | 5/2019 | Ferguson | G06Q 10/08355 |
| 2019/0325388 A1 * | 10/2019 | McLellan | G06Q 10/0833 |
| 2019/0342702 A1 * | 11/2019 | Shinar | H04W 4/40 |
| 2020/0005238 A1 * | 1/2020 | Richardson | G06Q 10/0832 |
| 2020/0201345 A1 * | 6/2020 | Ferguson | G06K 7/10722 |
| 2020/0242549 A1 * | 7/2020 | Daoura | H04W 4/029 |
| 2020/0286392 A1 * | 9/2020 | Miller | G05D 1/12 |
| 2020/0364663 A1 * | 11/2020 | Colella | G01C 21/3423 |

\* cited by examiner

*Primary Examiner* — Yonel Beaulieu

(57) ABSTRACT

A system and method for delivering to a package receptacle using a drone provides a secure automated delivery service for packages amongst users. The system accomplishes this by providing a receptacle that is equipped to store items for selective removal. The system includes at least one remote server and at least one delivery drone, wherein the remote server and the delivery drone are communicably coupled to each other. The system further includes at least one package receptacle capable of storing and selectively dispensing contained packages. Delivery instructions, including a pickup location and a receptacle location, are then sent from the remote server to the delivery drone. The physical package is next collected at the pickup location with the delivery drone. Once the delivery drone arrives at the receptacle location, the delivery drone lands atop the package receptacle and deposits the physical package safely inside.

7 Claims, 10 Drawing Sheets

SYSTEM AND METHOD FOR DELIVERING TO A PACKAGE RECEPTACLE USING A DRONE

FIELD OF THE INVENTION

The present invention generally relates to a package delivery drone system. More specifically, the system and method for delivering to a package receptacle using a drone relates to a package transportation mechanism and a related container equipped for temporary, secure storage of delivered packages and items.

BACKGROUND OF THE INVENTION

As technology improves, the omnipresence of delivery systems improves as well.

The convenience of shopping online has resulted in a surge of delivery jobs, and truck drivers are needed more than ever. Web companies such as Amazon and eBay are already well-familiar with the challenges presented by personal delivery means. All business forecasting further indicates that as logistics sort themselves out, food and groceries will soon be purchased online and delivered to a user's address as well. All of these industries rely, or will soon rely, upon their ability to move their products to a client's front door, where the user may subsequently take the package the last few steps into the user's house or home.

However, in several neighborhoods, such a system is presently unreliable. While web companies have largely figured out how to move their products to a user's address, there is often a large period of time in which the user is not available for package pickup. In many neighborhoods, packages seen resting on an online shopper's doorstep are viewed as easy targets for theft. Companies can protect themselves from theft responsibility by notifying the user when their package arrives and through extensive legal work; however, the person who ordered the package is then left in the dust. This applies not only to online shopping, but also to general package delivery, as may occur between friends and family. What is needed is a means of protecting packages from theft or tampering at their arrival location. Further desirable is a device which enables mailmen and package delivery services to easily add packages, and users to easily remove said packages at their convenience.

The present invention addresses these issues. The package deposit box secures by screws or bolts to a large concrete slab upon the ground. This prevents hostile groups from removing the whole package deposit box at once. An opening at the top allows package deliverers to quickly drop packages inside. A long, tall body ensures that packages are out of arms' reach from the top. Further, a one-way tongue extending in front of the opening prevents packages from exiting the present invention the same way they entered. A door with a lock and a unique key held or known only by the package deposit box owner allows the user to access their stored packages. In this way, the intended package recipient, or an approved friend of the package recipient, are the only ones who can access the contents of the present invention. A connected mobile application informs the user as to when a package arrives and is placed within the present invention (smart box, smart mailbox). The mobile application also informs the delivery persons of the specific location of the smart mailbox, alerts users (and authorities) if and when the smart box has been attempted to open and/or if an old password/passcode/code, etc. is opened, and/or can provide other updates by users and/or delivery persons as to location changes for a delivery, if necessary.

DETAILED DESCRIPTION OF THE INVENTION

All illustrations of the drawings are for the purpose of describing selected versions of the present invention and are not intended to limit the scope of the present invention.

Figure 1:
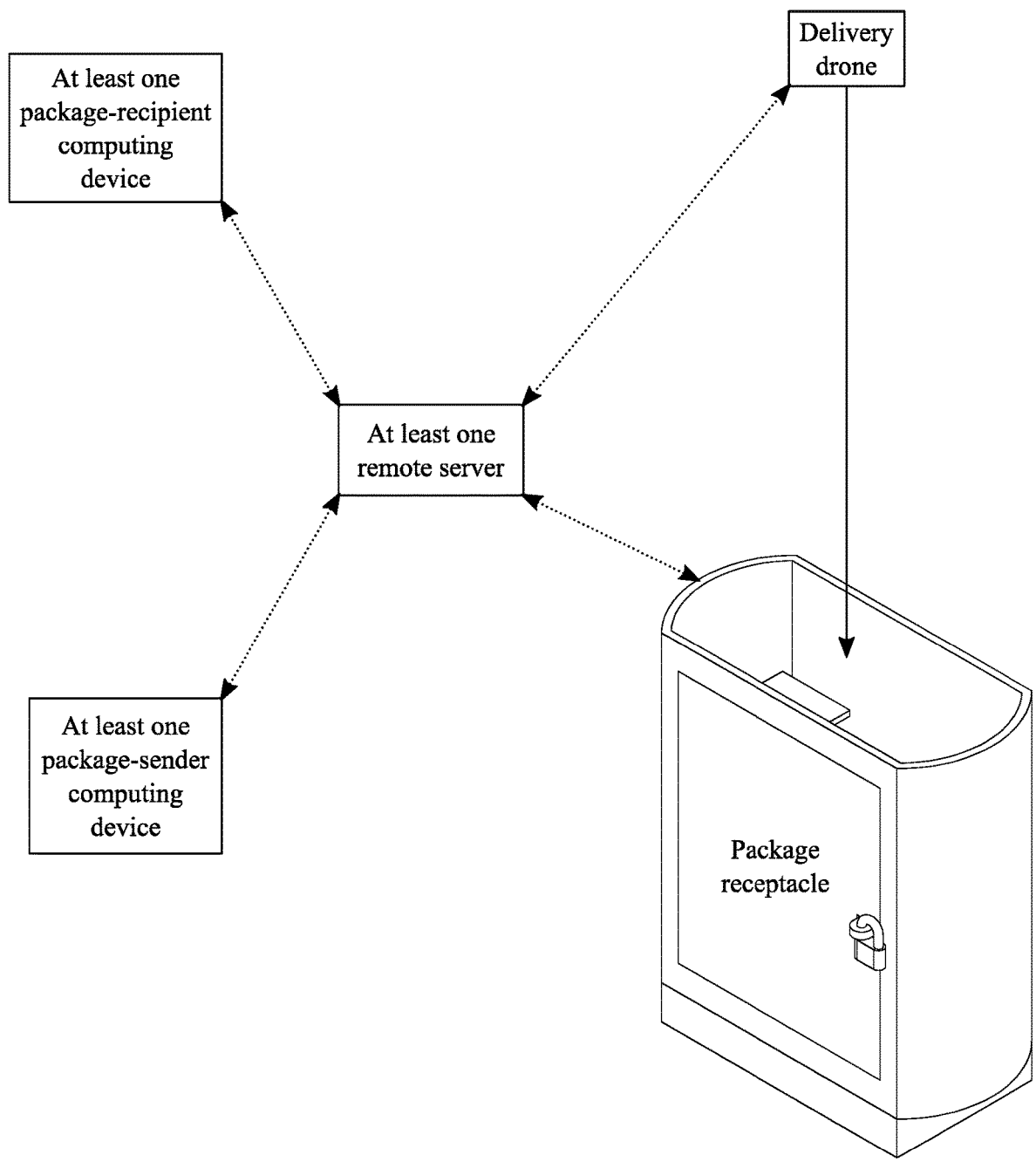
FIG. 1 is a block diagram illustrating the system for the present invention.

The present invention is a method for delivering to a package receptacle using a drone provides a secure automated delivery service for packages amongst users. The present invention accomplishes this by providing a receptacle that is equipped to store items for selective removal, as represented in FIG. 1. The system of the present invention includes at least one remote server and at least one delivery drone, wherein the remote server and the delivery drone are communicably coupled to each other (Step A). The at least one remote server is a communication hub capable of executing programmed commands, storing data, and sending and receiving information between connected electronic devices. The delivery drone is preferably an autonomous airborne device capable of containing and transporting packages from a pickup location to a drop-off location. The delivery drone may further provide compatibility with a variety of ancillary functions, including common military or government functions. The system further includes at least one package receptacle, wherein the package receptacle includes a rim, a tongue plate, and a one-way access hinge mechanism, and wherein the tongue plate is connected adjacent to the rim by the one-way access hinge mechanism (Step B). The at least one package receptacle relates to a unit capable of temporarily retaining items in an enclosure accessible through a one-way opening and subsequently enabling selective removal of said items by an authorized party. In the preferred embodiment of the present invention, the package receptacle is configured as the apparatus described in U.S. Pat. No. 10,349,770. The rim relates to a segment of the at least one package receptacle that allows for receipt of the delivery drone. The tongue plate is an extended rigid segment that effectively acts as a preferred landing pad for a delivery drone. The one-way access hinge mechanism relates to a mechanism that allows for selective addition of items to the at least one package receptacle.

Figure 2:
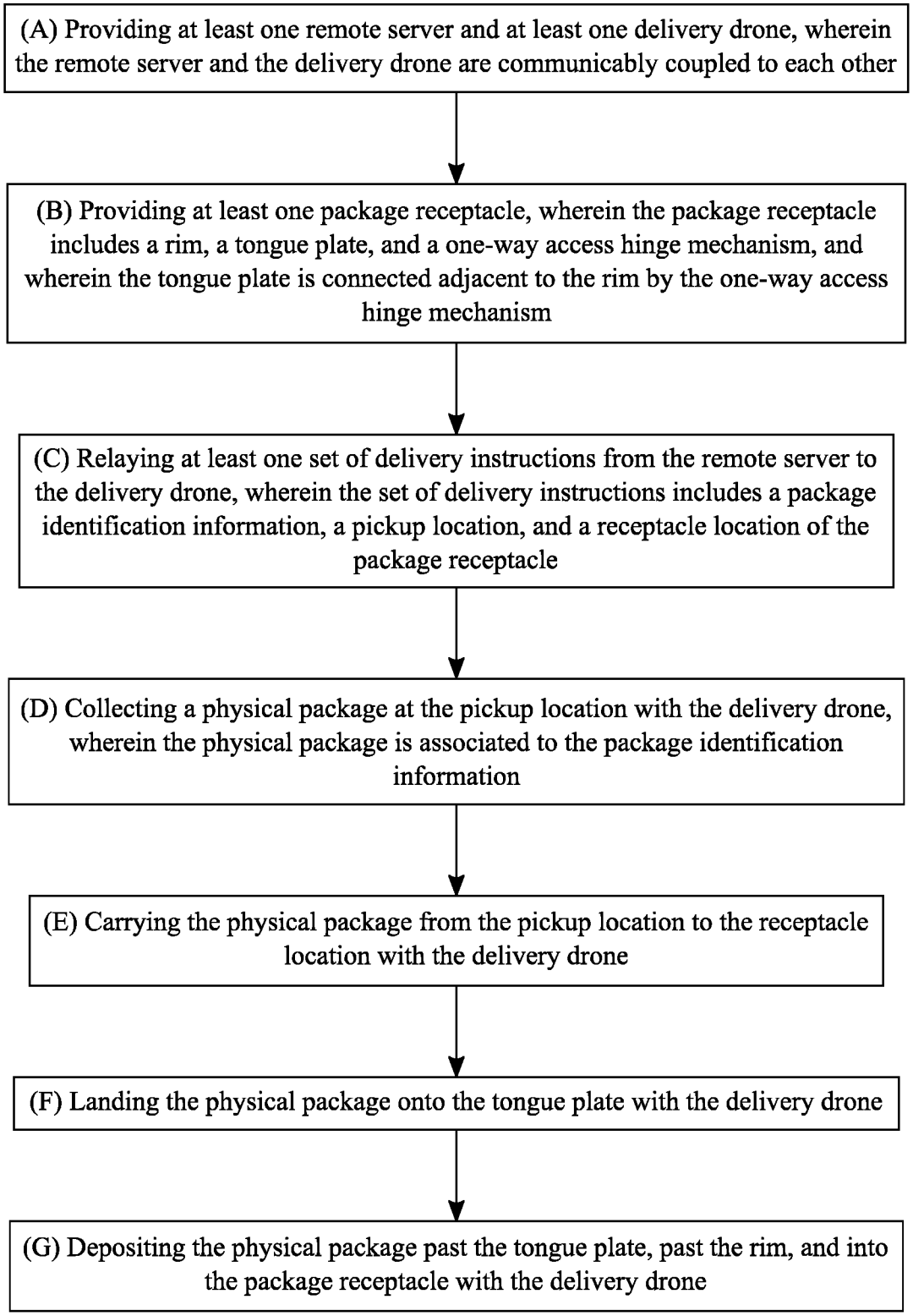
FIG. 2 is a flowchart illustrating an overall process for the method of the present invention.

An overall process for the method of the present invention enables the delivery drone to appropriately interact with the package receptacle. At least one set of delivery instructions is relayed from the remote server to the delivery drone, wherein the set of delivery instructions includes a package identification information, a pickup location, and a receptacle location of the package receptacle (Step C), as represented in FIG. 2. The package identification information relates to information including unique identification codes such as barcodes, quick response (QR) codes, radio frequency (RF) identifiers, and more. The pickup location is a location indicator that may be any of geospatial coordinates, postal address, or other such information that represents the location from which the package may be collected by the delivery drone. Similarly, the receptacle location is a location indicator that may be any of geospatial coordinates, postal address, or other such information that represents the location to which the package is to be delivered by the delivery drone. Next, a physical package is collected at the pickup location with the delivery drone, wherein the physical package is associated to the package identification information (Step D). The physical package may be of any size or shape that is within the ability of the delivery drone to contain during transportation. The physical package is carried from the pickup location to the receptacle location with the delivery drone (Step E). The delivery drone may be equipped with sensors, controllers, and a variety of other electronic devices capable of implementing the appropriate navigation commands upon propellers and various other required flight elements in order to enable the delivery drone to efficiently travel to the package receptacle. Next, the physical package is landed onto the tongue plate with the delivery drone (Step F). Such positioning enables subsequent entry of the physical package into the package receptacle. Finally, the physical package is deposited past the tongue plate, past the rim, and into the package receptacle with the delivery drone (Step G). Thus, the delivery drone ensures that the physical package safely arrives to the package receptacle and is secured within the package receptacle.

Figure 3:
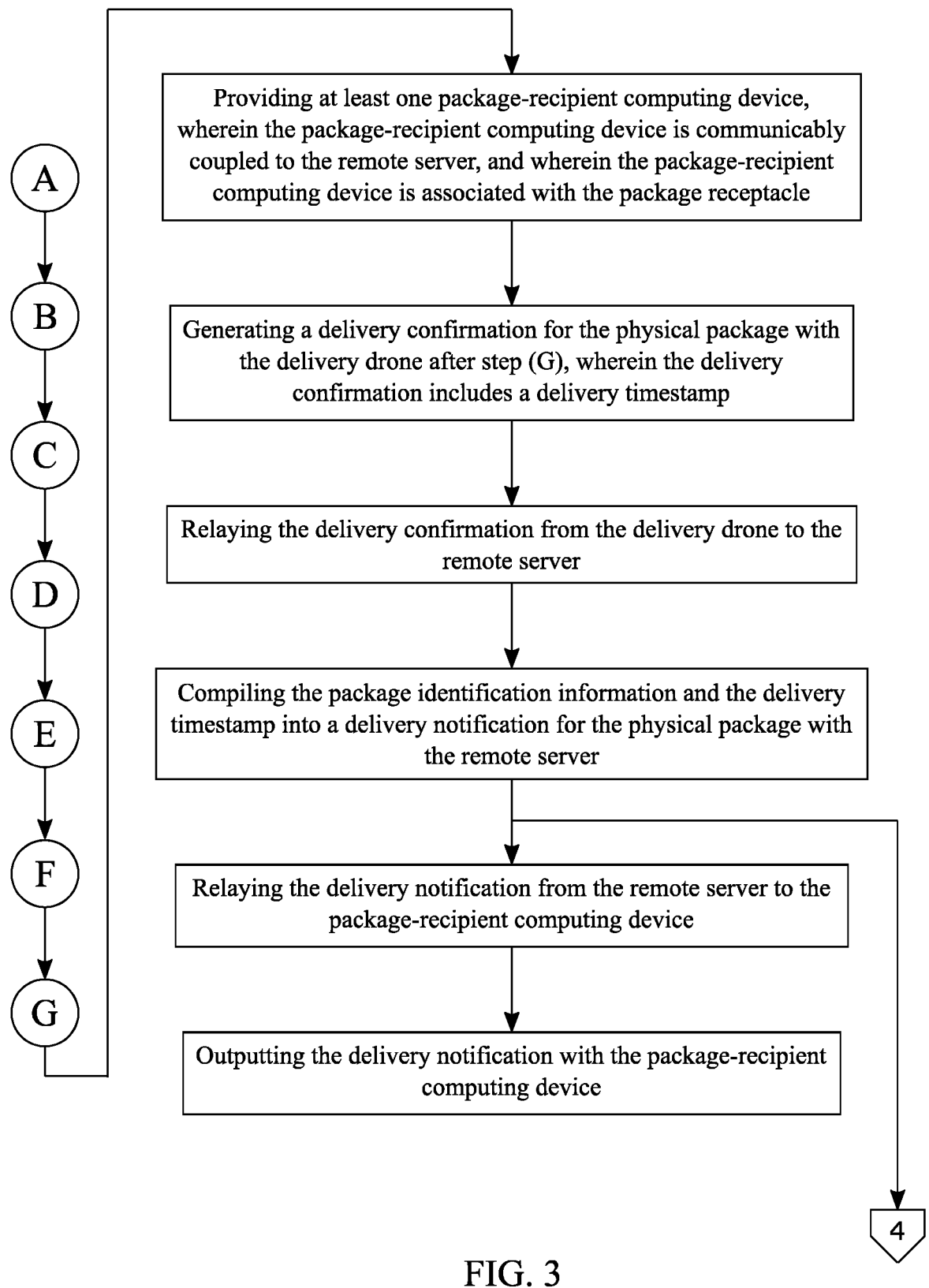
FIG. 3 is a flowchart illustrating the subprocess of generating delivery notifications for the package recipient from the delivery drone.

A package recipient may wish to be updated about the status of package delivery, and it may be advantageous to enable the package receptacle itself to register and respond to the presence or absence of delivered packages. To allow for such a capability, at least one package-recipient computing device is provided, wherein the package-recipient computing device is communicably coupled to the remote server, and wherein the package-recipient computing device is associated with the package receptacle, as represented in FIG. 3. The package receptacle is thus provided with features necessary to enable communication with the remote server. A delivery confirmation is generated for the physical package with the delivery drone after Step G, wherein the delivery confirmation includes a delivery timestamp. The delivery confirmation and the delivery timestamp relate to valuable information regarding the status of the delivery and the location of the physical package at a given time. The delivery confirmation is next relayed from the delivery drone to the remote server. In this way, the remote server is provided with the data necessary to perform analyses, process data, and determine appropriate responses. The package identification information and the delivery timestamp are next compiled into a delivery notification for the physical package with the remote server. The remote server thereby applies logic and mathematics to develop and arrange relevant information into appropriate formats for the delivery notification. The delivery notification is then relayed from the remote server to the package-recipient computing device. The package-recipient computing device may interpret and rearrange the delivery notification in order to present an optimal user interface. Finally, the delivery notification is outputted with the package-recipient computing device. In this way, the package-recipient computing device presents the delivery confirmation and the delivery timestamp upon receipt of the physical package by the package receptacle.

Figure 4:
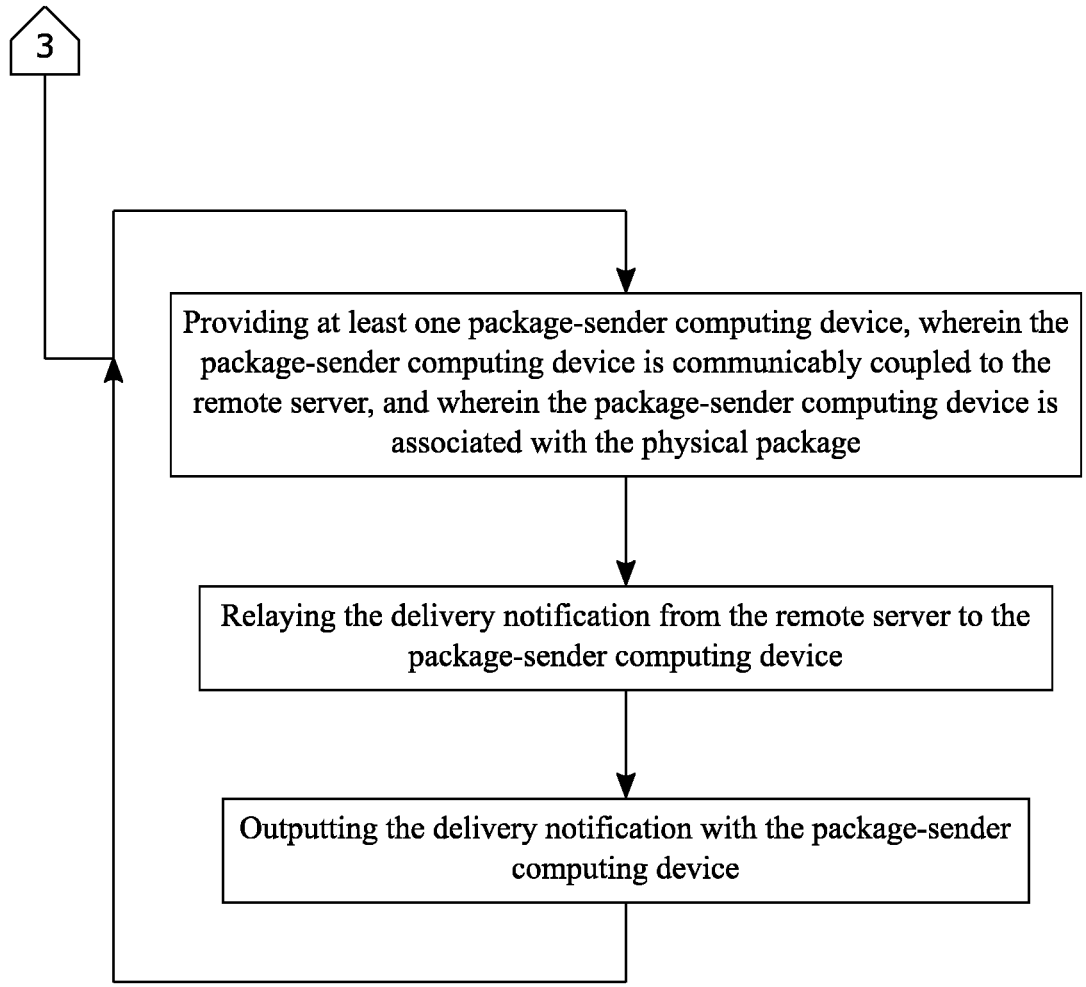
FIG. 4 is a flowchart illustrating the subprocess of generating delivery notifications for the package sender from the delivery drone.

Often, it is advantageous for the package sending party to be aware of delivery developments as they occur, including tracking, delivery status, and more. To provide for such a desire, at least one package-sender computing device is provided, wherein the package-sender computing device is communicably coupled to the remote server, and wherein the package-sender computing device is associated with the physical package, as represented in FIG. 4. The at least one package-sender computing device may include any of personal computers, smartphones, mobile devices, and a variety of other tools capable of communicating with the remote server. The delivery notification is also relayed from the remote server to the package-sender computing device. Therefore, the package-sender computing device is provided with the information necessary to present to the package sender. Then, the delivery notification is outputted with the package-sender computing device. Such an arrangement provides the package sender with confirmation information that may be beneficial towards future interactions with the package recipient or with other involved parties. The confirmation information may include a tracking number to pair with the package-sender computing device as the primary tracking device.

Figure 5:
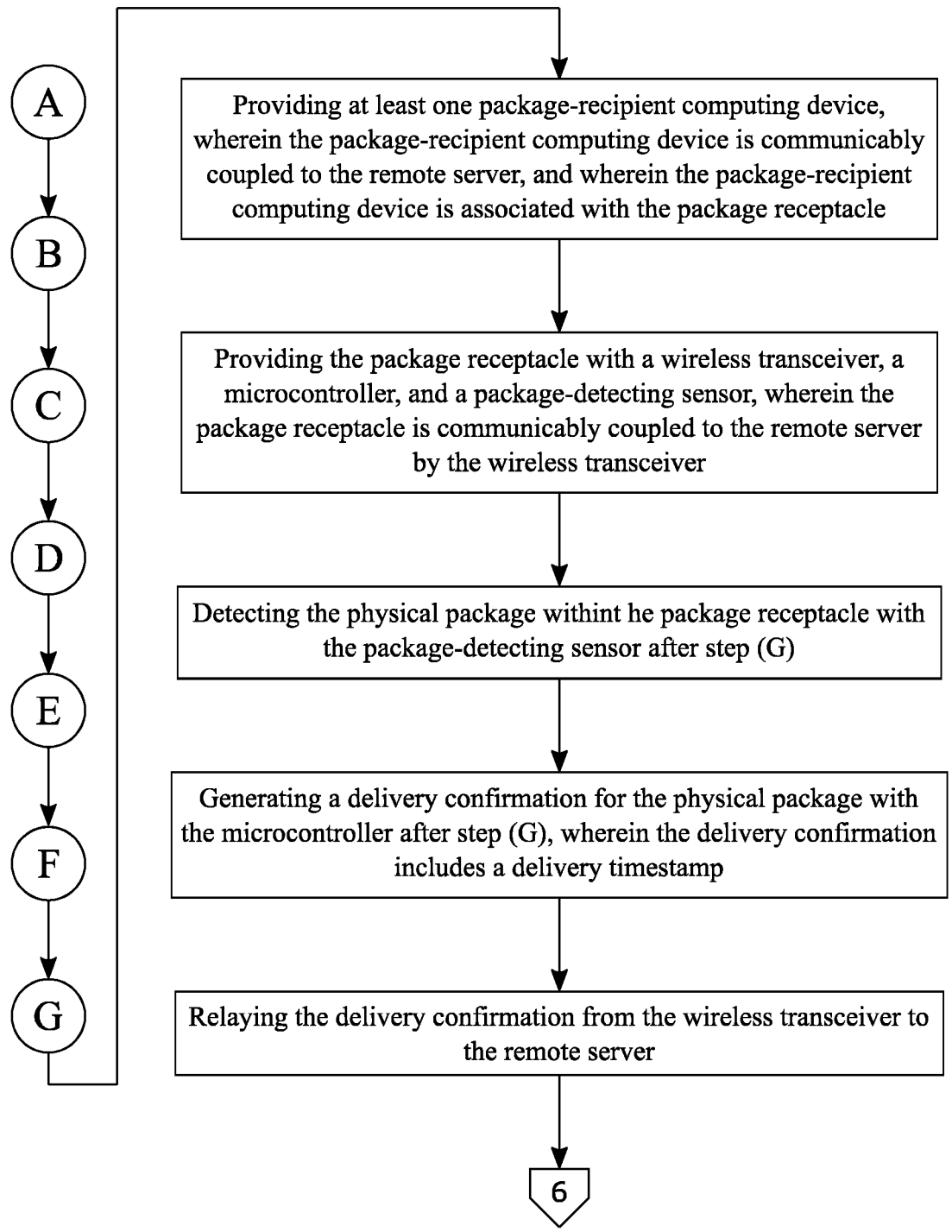
FIG. 5 is a flowchart illustrating the subprocess of generating delivery notifications for the package recipient from the package receptacle.

The package receptacle requires components necessary for allowing the package receptacle to respond to the presence or absence of items. To this end, at least one package-recipient computing device is provided, wherein the package-recipient computing device is communicably coupled to the remote server, and wherein the package-recipient computing device is associated with the package receptacle, as represented in FIG. 5. Furthermore, the package receptacle is provided with a wireless transceiver, a microcontroller, and a package-detecting sensor, wherein the package receptacle is communicably coupled to the remote server by the wireless transceiver. The wireless transceiver is a module capable of connecting the package receptacle to the remote server through the Internet. The microcontroller is an electronic device capable of accepting electronic data inputs from sensors or other sources, applying programmed logic, and subsequently relaying appropriate electronic signals. The package-detecting sensor is an electronic device capable of responding to the presence of the physical package within the package receptacle. The package-detecting sensor may include any or a combination of weight sensors, distance sensors, light sensors, or a variety of other electronic sensors capable of distinguishing between the presence or absence of the physical package. The physical package is detected within the package receptacle with the package-detecting sensor after Step G. In this way, the microcontroller may respond to the signal sent from the package-detecting sensor. A delivery confirmation for the physical package is generated with the microcontroller, wherein the delivery confirmation includes a delivery timestamp. The microcontroller may include a variety of information within the delivery confirmation after processing signals from the package-detecting sensor, including any or any combination of timing, duration of physical package presence, physical package dimensions, physical package weight, or more.

Figure 6:
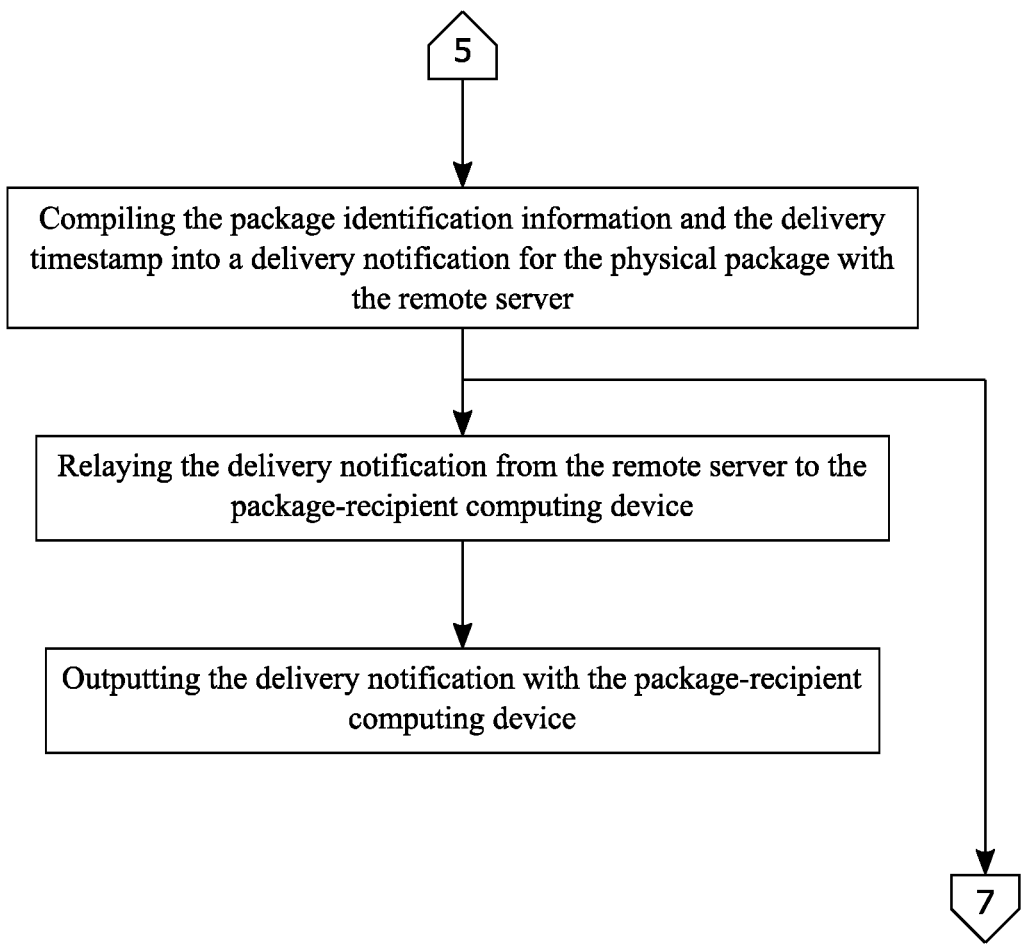
FIG. 6 is a continuation of FIG. 5.

Upon generation of the delivery confirmation, the microcontroller is prepared to proceed with transmission of the delivery confirmation to the next system features. The delivery confirmation is next relayed from the wireless transceiver to the remote server. This step allows the remote server to interpret and store data as necessary or desirable. The package identification information and the delivery timestamp are compiled into a delivery notification for the physical package with the remote server, as represented in FIG. 6. The delivery notification contains information including, but not limited to, timing, duration of physical package presence, physical package dimensions, physical package weight, and more. Next, the delivery notification is relayed from the remote server to the package-recipient computing device. This arrangement provides the package-recipient computing device with the information necessary for the package recipient to observe. Finally, the delivery notification is outputted with the package-recipient computing device. The delivery notification may be presented or arranged on the package-recipient computing device into a most intuitive or easy-to-use interface with a variety of navigation and interaction options for the package recipient.

Figure 7:
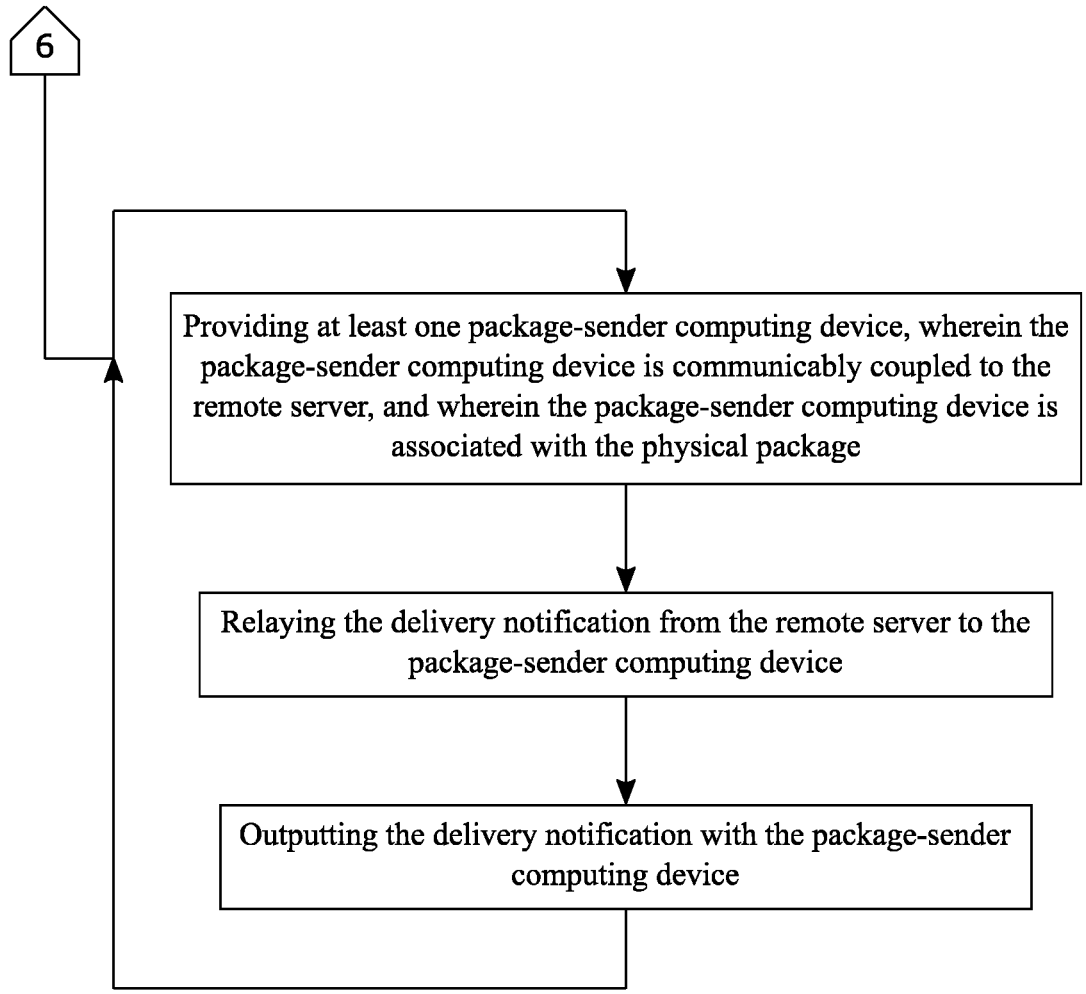
FIG. 7 is a flowchart illustrating the subprocess of generating delivery notifications for the package sender from the package receptacle.

Furthermore, it may be advantageous to allow the package sender to be aware of the delivery status of the physical package. To achieve this, at least one package-sender computing device is provided, wherein the package-sender computing device is communicably coupled to the remote server, and wherein the package-sender computing device is associated with the physical package, as represented in FIG. 7. The package-sender computing device relates to any of smartphones, personal computers, mobile devices, or a variety of other tools capable of connecting a package sender to the Internet. The delivery notification is also relayed from the remote server to the package-sender computing device. Thus, the package-sender computing device is provided with all necessary information that is required by the package sender. Finally, the delivery notification is outputted with the package-sender computing device. In this way, the package sender is presented with information regarding the delivery status of the physical package in a format determined to be most advantageous and efficient. The confirmation information may include a tracking number to pair with the package-sender computing device as the primary tracking device.

Figure 8:
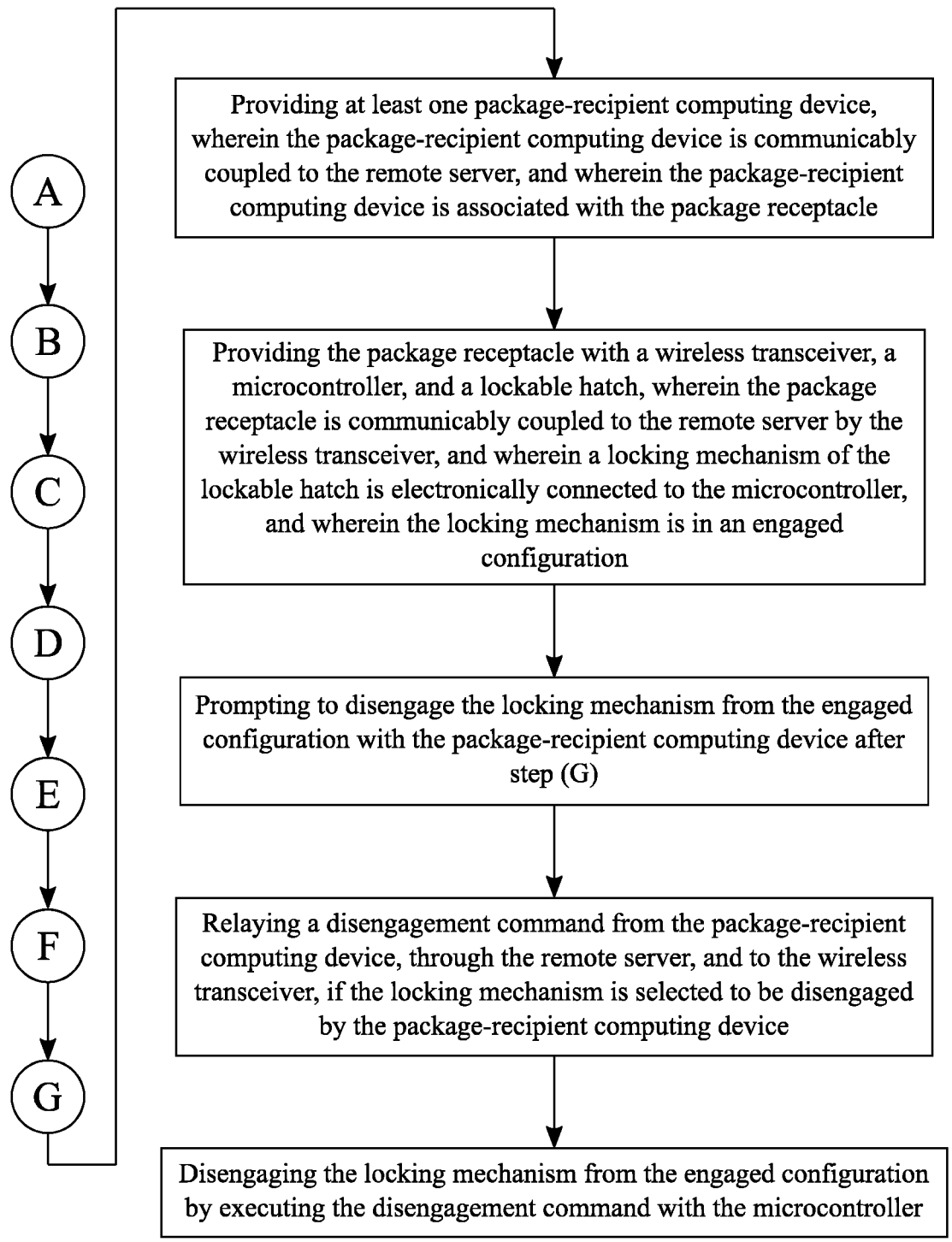
FIG. 8 is a flowchart illustrating the subprocess of locking the package receptacle.

A user of the present invention may desire the ability to provide togglable remote access to the contents of the package receptacle. To achieve this, at least one package-recipient computing device is provided, wherein the package-recipient computing device is communicably coupled to the remote server, and wherein the package-recipient computing device is associated with the physical package, as represented in FIG. 8. The package-recipient computing device relates to any of smartphones, personal computers, mobile devices, or a variety of other tools capable of connecting a package recipient to the Internet. Furthermore, the package receptacle is provided with a wireless transceiver, a microcontroller, and a lockable hatch, wherein the package receptacle is communicably coupled to the remote server by the wireless transceiver, and wherein a locking mechanism of the lockable hatch is electronically connected to the microcontroller, and wherein the locking mechanism is in an engaged configuration. The wireless transceiver is a module capable of connecting the package receptacle to the remote server through the Internet. The microcontroller is an electronic device capable of accepting electronic data inputs from sensors or other sources, applying programmed logic, and subsequently relaying appropriate electronic signals. The lockable hatch relates to an opening with an electronically-operated closure capable of enabling selective access to the contents of the package receptacle. In the engaged configuration, the lockable hatch prevents manual insertion or removal of items from the package receptacle. The package-recipient computing device prompts to disengage the locking mechanism from the engaged configuration after Step G. In this way, the locking mechanism may receive an electronic signal communicating the necessary configuration change. A disengagement command is relayed from the package-recipient computing device, through the remote server, and to the wireless transceiver, if the locking mechanism is selected to be disengaged by the package-recipient computing device. Thus, the package recipient is able to communicate a selective change in the configuration of the locking mechanism. The locking mechanism is subsequently disengaged from the engaged configuration by executing the disengagement command with the microcontroller. Thus, the package recipient can remotely control the accessibility of the contents of the package receptacle.

Figure 9:
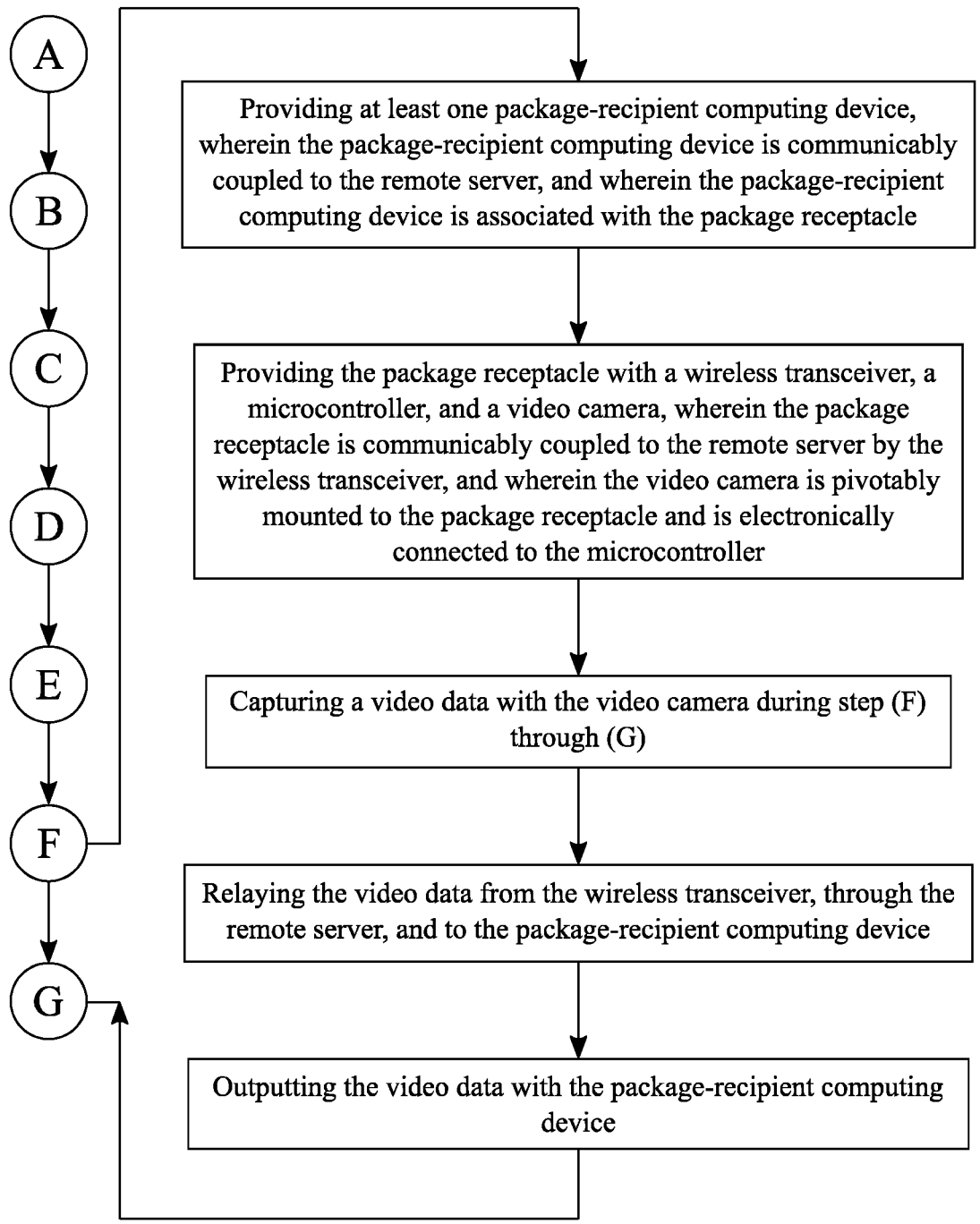
FIG. 9 is a flowchart illustrating the subprocess of capturing video recordings in proximity to the package receptacle.

A user of the package receptacle may desire further security measures to be in place, as well as data regarding the physical surroundings of the package receptacle. To provide for this desire, at least one package-recipient computing device is provided, wherein the package-recipient computing device is communicably coupled to the remote server, and wherein the package-recipient computing device is associated with the physical package, as represented in FIG. 9. The package-recipient computing device relates to any of smartphones, personal computers, mobile devices, or a variety of other tools capable of connecting a package recipient to the Internet. Furthermore, the package receptacle is provided with a wireless transceiver, a microcontroller, and a video camera, wherein the package receptacle is communicably coupled to the remote server by the wireless transceiver, and wherein the video camera is pivotably mounted to the package receptacle and is electronically connected to the microcontroller. The wireless transceiver is a module capable of communicating the package receptacle to the remote server through the Internet. The microcontroller is an electronic device capable of accepting electronic data inputs from sensors or other sources, applying programmed logic, and subsequently relaying appropriate electronic signals. The video camera is a device that enables capture of visual data with respect to ambient physical surroundings and subsequent transferal of that data. In an exemplary embodiment, the video camera may be of closed-circuit television (CCTV) type. A video data is captured with the video camera during Step F through G. Such data may further be captured upon prompting by receipt of an appropriate signal from any of a variety of sensors capable of determining approaching and potentially hostile entities. The video data is relayed from the wireless transceiver, through the remote server, and to the package-recipient computing device. In this way, the package-recipient computing device obtains video data relating to events occurring in proximity to the package receptacle, and the remote server may store the video data for later use. Next, the video data is outputted with the package-recipient computing device. Thus, the package recipient may view and navigate relevant video footage from a desired time in order to witness the delivery of the physical package into the package receptacle.

Figure 10:
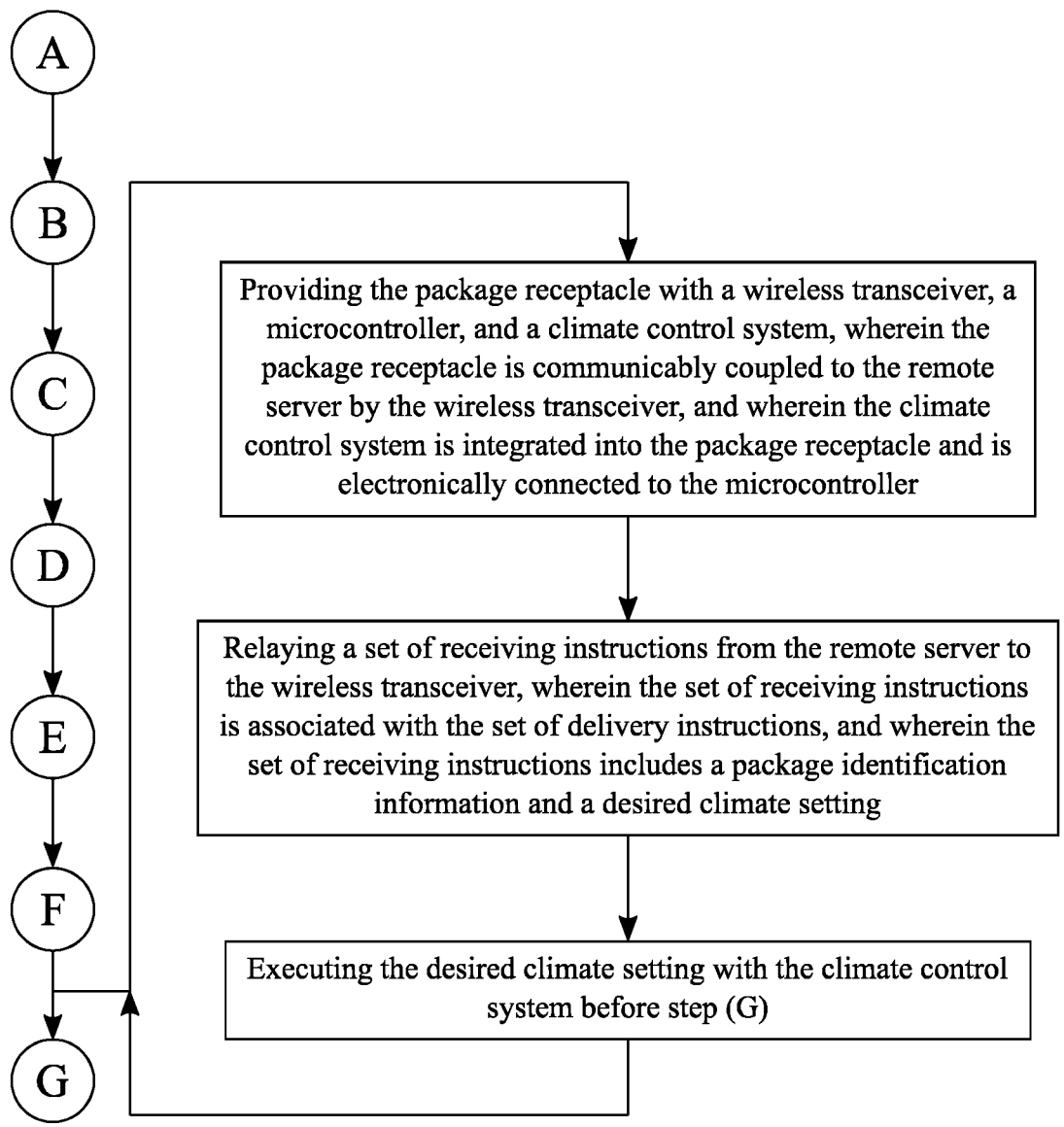
FIG. 10 is a flowchart illustrating the subprocess of enabling climate control.

In many use cases, the physical package may include items that are sensitive to being stored at different temperatures and may thus benefit from the inclusion of features that may adjust the storage temperature of the package receptacle. To allow this, the package receptacle is provided with a wireless transceiver, a microcontroller, and a climate control system, wherein the package receptacle is communicably coupled to the remote server by the wireless transceiver, and wherein the climate control system is integrated into the package receptacle and is electronically connected to the microcontroller, as represented in FIG. 10. The wireless transceiver is a module capable of connecting the package receptacle to the remote server through the Internet. The microcontroller is an electronic device capable of accepting electronic data inputs from sensors or other sources, applying programmed logic, and subsequently relaying appropriate electronic signals. The climate control system relates to a set of thermal controlling units, which may include any or all of temperature sensors, heating elements, cooling elements, humidity adjustment elements, and more. A set of receiving instructions is next relayed from the remote server to the wireless transceiver, wherein the set of receiving instructions is associated with the set of delivery instructions, and wherein the set of receiving instructions includes a package identification information and a desired climate setting. The package identification information relates to specific codes, patterns, or other such identifying information that may be included in order to identify and distinguish the physical package. The desired climate setting relates to the precise conditions specified as optimal for storage of the physical package (e.g. refrigeration for specific kinds of food). The desired climate setting is then executed with the climate control system before Step G. Thus, the physical package is retained in an environment that is capable of protecting items contained within the physical package.

Packages may be vulnerable to damage from being dropped into the package receptacle. To mitigate damage risk, in a further embodiment, the package receptacle may be provided with a cushion. The cushion is a generally flat foam or polymeric layer that absorbs mechanical energy due to various impacts. The physical package is then dropped upon the cushion. Thus, the potentially-damaging impact transmitted to the physical package is reduced or eliminated.

Although the invention has been explained in relation to its preferred embodiment, it is to be understood that many other possible modifications and variations can be made without departing from the spirit and scope of the invention as hereinafter claimed.

What is claimed is:

1. A method for delivering to a package receptacle using a drone, the method comprises the steps of:
   (A) providing at least one remote server and at least one delivery drone, wherein the remote server and the delivery drone are communicably coupled to each other;
   (B) providing at least one package receptacle, wherein the package receptacle includes a rim, a tongue plate, a one-way access hinge mechanism, a wireless transceiver, a microcontroller and a climate control system, wherein the package receptacle is communicably coupled to the remote server by the wireless transceiver, wherein the climate control system is integrated into the package receptacle and is electronically connected to the microcontroller, and wherein the tongue plate is connected adjacent to the rim by the one-way access hinge mechanism;
   (C) relaying at least one set of delivery instructions from the remote server to the delivery drone, wherein the set of delivery instructions includes a desired climate setting, a package identification information, a pickup location, and a receptacle location of the package receptacle;
   (D) collecting a physical package at the pickup location with the delivery drone, wherein the physical package is associated to the package identification information;
   (E) carrying the physical package from the pickup location to the receptacle location with the delivery drone;
   (F) landing the physical package onto the tongue plate with the delivery drone;
   relaying a set of receiving instructions from the remote server to the wireless transceiver, wherein the set of receiving instructions is associated with the set of delivery instructions;
   executing the desired climate setting with the climate control system; and
   (G) depositing the physical package past the tongue plate, past the rim, and into the package receptacle with the delivery drone.

2. The method for delivering to a package receptacle using a drone, the method as claimed in claim 1 comprises the steps of:
   providing at least one package-recipient computing device, wherein the package-recipient computing device is communicably coupled to the remote server, and wherein the package-recipient computing device is associated with the package receptacle;
   generating a delivery confirmation for the physical package with the delivery drone after step (G), wherein the delivery confirmation includes a delivery timestamp;
   relaying the delivery confirmation from the delivery drone to the remote server;
   compiling the package identification information and the delivery timestamp into a delivery notification for the physical package with the remote server;
   relaying the delivery notification from the remote server to the package-recipient computing device; and
   outputting the delivery notification with the package-recipient computing device.

3. The method for delivering to a package receptacle using a drone, the method as claimed in claim 2 comprises the steps of:
   providing at least one package-sender computing device, wherein the package-sender computing device is communicably coupled to the remote server, and wherein the package-sender computing device is associated with the physical package;
   relaying the delivery notification from the remote server to the package-sender computing device; and
   outputting the delivery notification with the package-sender computing device.

4. The method for delivering to a package receptacle using a drone, the method as claimed in claim 1 comprises the steps of:
   providing at least one package-recipient computing device, wherein the package-recipient computing device is communicably coupled to the remote server, and wherein the package-recipient computing device is associated with the package receptacle;
   providing the package receptacle with a wireless transceiver, a microcontroller, and a package-detecting sensor, wherein the package receptacle is communicably coupled to the remote server by the wireless transceiver;

detecting the physical package within the package receptacle with the package-detecting sensor after step (G);

generating a delivery confirmation for the physical package with the microcontroller, wherein the delivery confirmation includes a delivery timestamp;

relaying the delivery confirmation from the wireless transceiver to the remote server;

compiling the package identification information and the delivery timestamp into a delivery notification for the physical package with the remote server;

relaying the delivery notification from the remote server to the package-recipient computing device; and outputting the delivery notification with the package-recipient computing device.

5. The method for delivering to a package receptacle using a drone, the method as claimed in claim 4 comprises the steps of:

providing at least one package-sender computing device, wherein the package-sender computing device is communicably coupled to the remote server, and wherein the package-sender computing device is associated with the physical package;

relaying the delivery notification from the remote server to the package-sender computing device; and outputting the delivery notification with the package-sender computing device.

6. The method for delivering to a package receptacle using a drone, the method as claimed in claim 1 comprises the steps of:

providing at least one package-recipient computing device, wherein the package-recipient computing device is communicably coupled to the remote server, and wherein the package-recipient computing device is associated with the package receptacle;

providing the package receptacle with a wireless transceiver, a microcontroller, and a lockable hatch, wherein the package receptacle is communicably coupled to the remote server by the wireless transceiver, and wherein a locking mechanism of the lockable hatch is electronically connected to the microcontroller, and wherein the locking mechanism is in an engaged configuration;

prompting to disengage the locking mechanism from the engaged configuration with the package-recipient computing device after step (G);

relaying a disengagement command from the package-recipient computing device, through the remote server, and to the wireless transceiver, if the locking mechanism is selected to be disengaged by the package-recipient computing device; and disengaging the locking mechanism from the engaged configuration by executing the disengagement command with the microcontroller.

7. The method for delivering to a package receptacle using a drone, the method as claimed in claim 1 comprises the steps of:

providing at least one package-recipient computing device, wherein the package-recipient computing device is communicably coupled to the remote server, and wherein the package-recipient computing device is associated with the package receptacle;

providing the package receptacle with a wireless transceiver, a microcontroller, and a video camera, wherein the package receptacle is communicably coupled to the remote server by the wireless transceiver, and wherein the video camera is pivotably mounted to the package receptacle and is electronically connected to the microcontroller;

capturing a video data with the video camera during step (F) through (G);

relaying the video data from the wireless transceiver, through the remote server, and to the package-recipient computing device; and outputting the video data with the package-recipient computing device.

\* \* \* \* \*